DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 23, 1971

892 O.G. 1209

T892,004

POLYETHYLENE WAXES AND PREPARATION THEREOF

Hugh John Hagemeyer, Jr., and Reeder Eugene Bissell, both % Texas Eastman Co., Box 2068, Longview, Tex. 75601

Continuation of application Ser. No. 679,662, Nov. 1, 1967. This application Aug. 27, 1970, Ser. No. 67,580

Int. Cl. C08h *9/06*

U.S. Cl. 106—271

No Drawing. 18 Pages Specification

Synthetic emulsifiable polyethylene waxes having excellent hardness and softening point characteristics are produced by the esterification of degraded hydrogenated and oxidized polyethylene with an aliphatic primary alcohol. The emulsifiable wax products are useful in the preparation of liquid emulsion polishes for floors, automobiles, and in the other similar commercial applications.